US008421390B2

(12) United States Patent
He

(10) Patent No.: US 8,421,390 B2
(45) Date of Patent: Apr. 16, 2013

(54) FAN MOTOR CONTROL DEVICE

(75) Inventor: HaiJun He, Hui Zhou (CN)

(73) Assignee: Cooler Master Co., Ltd., New Taipei (TW)

( * ) Notice: Subject to any disclaimer, the term of this patent is extended or adjusted under 35 U.S.C. 154(b) by 210 days.

(21) Appl. No.: 13/094,910

(22) Filed: Apr. 27, 2011

(65) Prior Publication Data
US 2012/0274252 A1 Nov. 1, 2012

(51) Int. Cl.
*H02P 1/04* (2006.01)
(52) U.S. Cl.
USPC ............ 318/430; 318/778; 318/779; 388/804
(58) Field of Classification Search .................. 318/430, 318/778, 779; 388/804
See application file for complete search history.

(56) References Cited

U.S. PATENT DOCUMENTS

| 7,038,412 | B2* | 5/2006 | Karwath et al. | 318/400.22 |
| 7,570,009 | B2* | 8/2009 | Hsieh et al. | 318/779 |
| 7,609,018 | B2* | 10/2009 | Lin et al. | 318/471 |
| 2012/0194115 | A1* | 8/2012 | Hu | 318/461 |

* cited by examiner

*Primary Examiner* — Erick Glass
(74) *Attorney, Agent, or Firm* — Li&Cai Intellectual Property (USA) Office

(57) ABSTRACT

A fan motor control device for controlling the soft start of a fan motor is disclosed. The fan motor control device comprises a converter, a starting capacitor, and a controller. The converter sends out a control signal to the controller based on an input pulse-width modulation signal. The starting capacitor is coupled between a voltage source terminal and a controlled terminal of the controller. Thereby, based on an input voltage to the controlled terminal, the controller controls the soft start of the fan motor. For the soft start period, the magnitude of the input voltage is determined by the base working voltage outputted via the voltage source terminal. While for normal operation, based on the input voltage to the controlled terminal, the controller controls the speed of the fan motor, with the magnitude of the input voltage determined by the control voltage outputted by the converter.

9 Claims, 3 Drawing Sheets

FAN MOTOR CONTROL DEVICE

BACKGROUND OF THE INVENTION

1. Field of the Invention

The instant disclosure relates to a fan motor control device; more particularly, to a fan motor control device for controlling the soft start of the fan motor.

2. Description of Related Art

A circuit diagram for a conventional fan motor control device 1 is shown in FIG. 1. The fan motor control device 1 normally employs a controller 10 to drive a fan motor 12. The controller 10 may be an integrated circuit (IC) unit having different pins for connecting to a Hall device 14, a converter 16, and other electric circuits. The Hall device 14 is assigned to detect the operation status of the fan motor 12 and generate instantaneous feedback signal (not shown) to the controller 10.

A controlled terminal VTH of the controller 10 receives an input voltage signal V1 from the converter 16. For the lowest rotational speed (also called speed of revolution), the controller 10 has a lowest rotational speed setup terminal RMI for receiving a lowest rotational speed threshold voltage V2 from an external circuit 15. Once powered up, the controller 10 would normally control the fan motor 12 speed based on the magnitude of the input voltage signal V1.

Thereby, during the initial start-up, the controller 10 would consume more power. Plus, the controller 10 would be subjected to higher starting current. The impact of high starting current tends to reduce the service life of the controller 10. In addition, as the fan motor speed picks up immediately once the controller 10 is powered up, excessive fan noise can be heard.

SUMMARY OF THE INVENTION

A fan motor control device is provided by the instant disclosure, which utilizes the charging characteristics of a starting capacitor to control the soft start of the fan motor.

According to one embodiment, the fan motor control device comprises a converter, a starting capacitor, and a controller. The converter has a signal input terminal, a voltage source output terminal, and a control voltage output terminal. The converter receives a pulse-width modulation (PWM) signal via the signal input terminal. Based on the PWM signal, a control voltage is outputted via the control voltage output terminal. The controller has a voltage source terminal, a controlled terminal, and an output terminal. The voltage source terminal is coupled to a first terminal of the starting capacitor and the voltage source output terminal of the converter. The controlled terminal is coupled to a second terminal of the starting capacitor and the control voltage output terminal of the converter. The output terminal is coupled to the fan motor.

Thereby, based on the input voltage via the controlled terminal, the controller controls the soft start of the fan motor, wherein the magnitude of the input voltage is determined by the base working voltage outputted by the voltage source terminal. After the soft start period, based on the input voltage via the controlled terminal, the controller controls the fan motor operation, wherein the magnitude of the input voltage is determined by the control voltage outputted by the converter instead.

Based on the above, the fan motor control device of the instant disclosure employs the charging characteristics of the starting capacitor in reducing the input voltage to the controller into a pre-determined voltage. During this period, the fan motor control device would provide a low working current (the working current gradually increases from zero to a set value) to drive the fan motor at a low rotational speed (the rotational speed increases gradually from zero to a set value), thus achieving the soft start condition. Thereby, during the initial power-up of the fan motor, the fan motor control device can effectively reduce the power consumption, prevent impact due to high starting current, and lower the fan noise.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENT

A fan motor control device of the instant disclosure employs the charging characteristics of a starting capacitor to control the soft start of the fan motor. More specifically, once powered up, the starting capacitor first enters a shorted state. Voltage is gradually built up until the starting capacitor is fully charged to reach an open circuit state. Based on the aforementioned charging characteristics of the starting capacitor, the fan motor control device would provide a lower working current to the fan motor initially, for enabling the fan motor to operate at a low speed in fulfilling the soft start condition.

Figure 1:
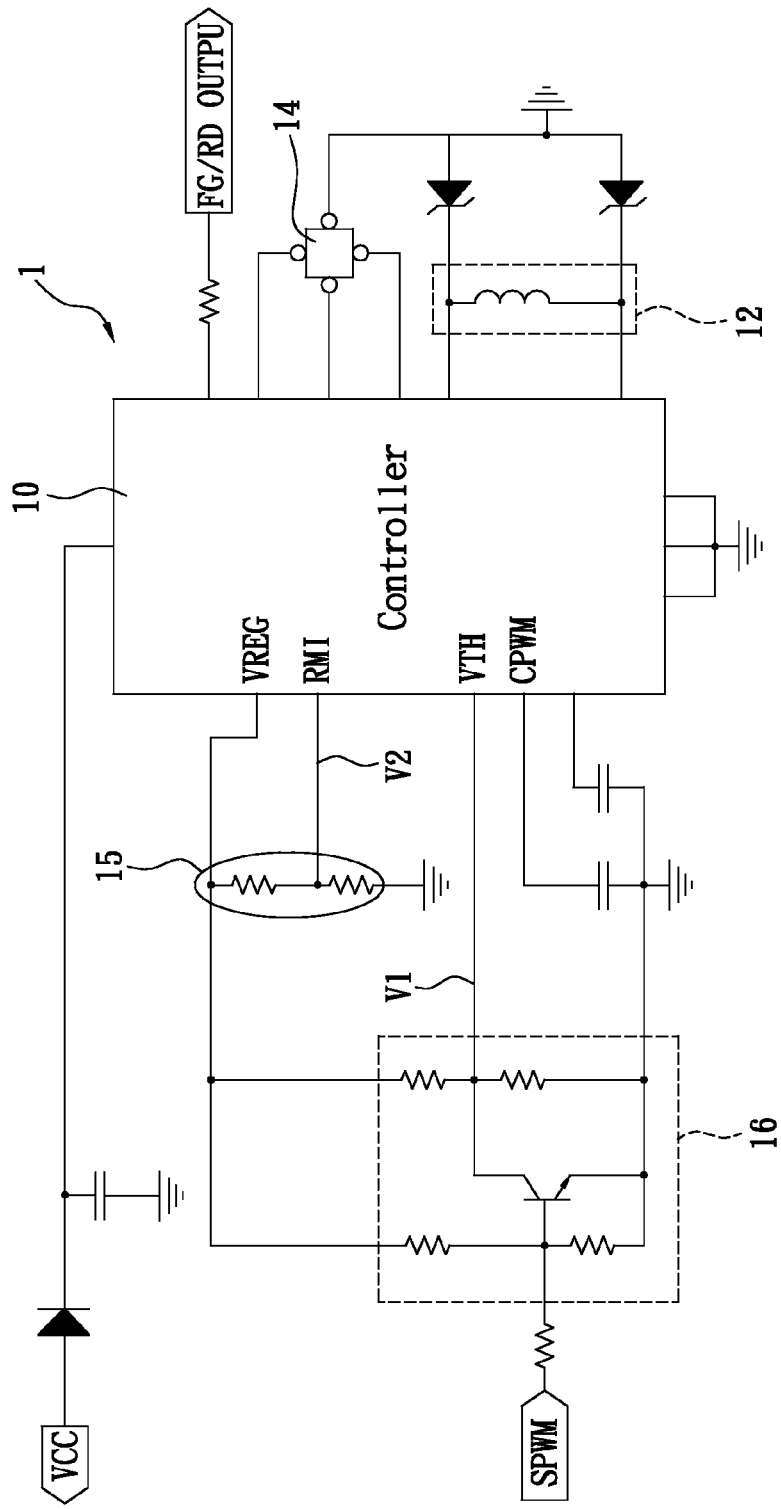
FIG. 1 is a circuit diagram for a conventional fan motor control device.
Figure 2:
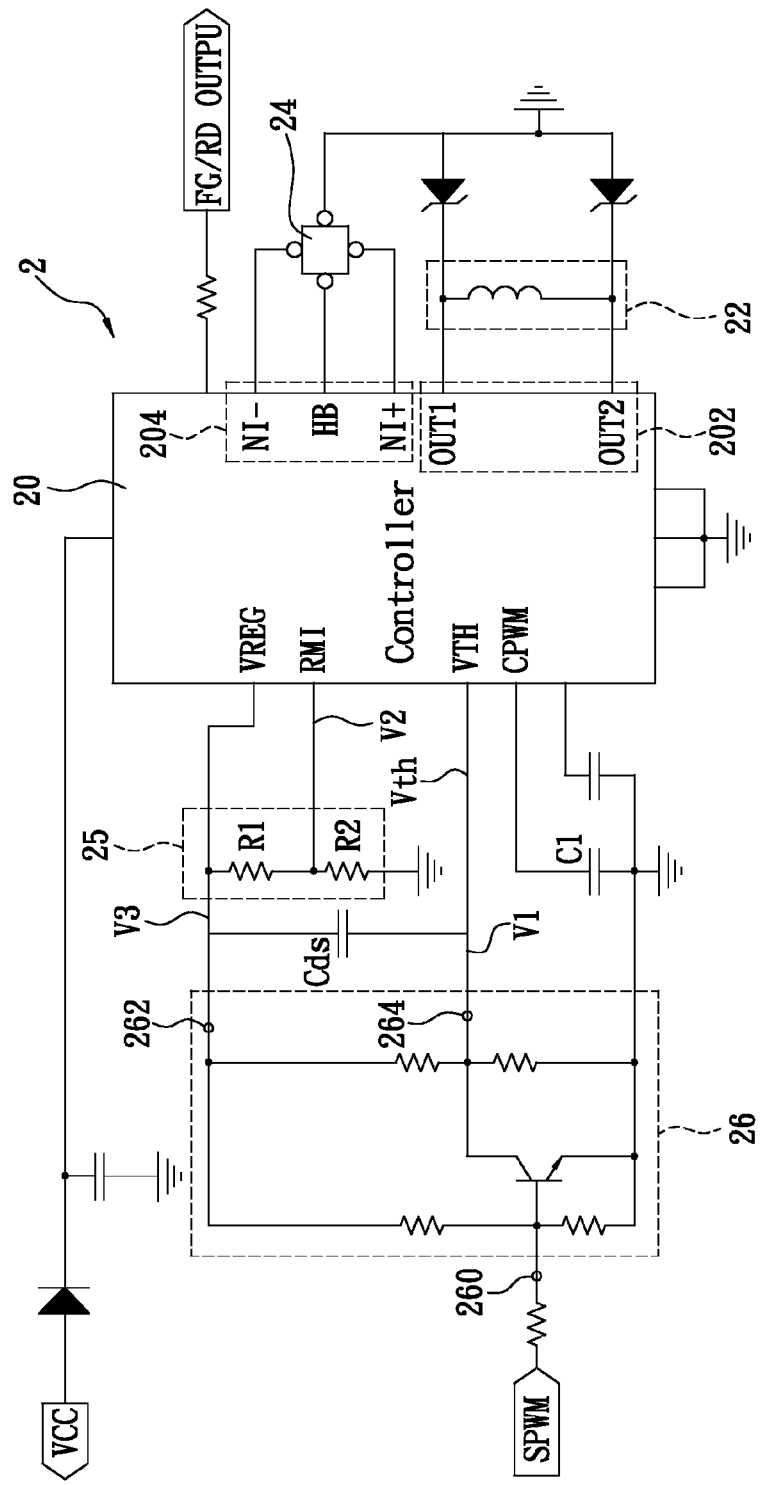
FIG. 2 is a circuit diagram for a fan motor control device of the instant disclosure.

Please refer to FIG. 2, which shows a circuit diagram for the fan motor control device of the instant disclosure. The fan motor control device 2 comprises a controller 20, a starting capacitor Cds, and a converter 26. The controller 20 may be an integrated circuit (IC), a micro controller (MCU), or a chip. The functions of the controller 20 are carried out by its electrical circuit and/or software program.

The controller 20 has a voltage source terminal VREG, a lowest rotational speed setup terminal RMI, a controlled terminal VTH, an oscillation signal setup terminal CPWM, an output terminal 202, and a detecting terminal 204. The voltage source terminal VREG is coupled to the first terminal of the starting capacitor Cds and a voltage source output terminal 262 of the converter 26. The controlled terminal VTH is coupled to the second terminal of the starting capacitor Cds and a controlled voltage output terminal 264 of the converter 26. The output terminal 202 is coupled to a fan motor 22, and the detecting terminal 204 is coupled to a motor speed detecting unit 24.

More specifically, the output terminal 202 of the controller 20 has a first output terminal OUT1 and a second output terminal OUT2. The first and second output terminals OUT1 and OUT2 are both coupled to the wound coil of the fan motor 22. The detecting terminal 204 has a positive input terminal NI+, a negative input terminal NI−, and a bias voltage terminal HB. The bias voltage terminal HB exports a fixed bias voltage to the motor speed detecting unit 24. The positive and negative input terminals NI+ and NI− receive respective feedback signals from the motor speed detecting unit 24.

The aforementioned motor speed detecting unit 24 can be a Hall integrated circuit (Hall IC). Based on the Hall effect, the Hall IC represents the change in the magnetic field through the change in electric current. In this embodiment, such technique is applied to detect the rotor position of the fan motor 22. Based on the feedback signal, which is generated by the Hall IC upon detecting a change in the magnetic field of the fan motor 22, the controller 20 is acknowledged of the rotor position of the fan motor 22. The controller 20 then changes the output signal to control the speed of the fan motor 22.

Again, please refer to FIG. 2. The controller 20 has the oscillation signal setup terminal CPWM, which is coupled to a first capacitor C1. Based on the size (capacitance value) of the first capacitor C1, the oscillation signal setup terminal CPWM generates internally an oscillation signal S1 (see FIG. 3) of corresponding frequency. In other words, the frequency of the oscillation signal S1 depends on the size of the first capacitor C1.

Again in FIG. 2, the signal input terminal 260 is set to receive a pulse-width modulation signal SPWM. Based on the pulse-width modulation signal SPWM, a control voltage V1 is outputted via the control voltage output terminal 264 to the controller 20. More specifically, based on the input pulse-width modulation signal SPWM from an external element (not shown), such as a processor or an integrated circuit, the converter 26 converts a base working voltage V3 outputted by the voltage source terminal VREG of the controller 20 into the control voltage V1. The converter 26 then sends the control voltage V1 into the controlled terminal VTH of the controller 20. The duty cycle of the aforementioned pulse-width modulation signal SPWM changes according to the temperature of the external element. Relatedly, the magnitude of the control voltage V1 depends on the duty cycle of the pulse-width modulation signal SPWM and the base working voltage V3.

In other words, when the base working voltage V3 is constant, the magnitude of the control voltage V1 is determined by the temperature of the external element. Thereby, based on the change in temperature of the external element, the controller 20 would control the speed of the fan motor 22 accordingly where the fan speed can be adjusted.

Please refer back to FIG. 2. A voltage divider 25 is coupled between the lowest rotational speed setup terminal RMI and the voltage source terminal VREG of the controller 20. In particular, the lowest rotational speed setup terminal RMI receives a lowest rotational speed threshold voltage V2 from the voltage divider 25. More specifically, the voltage divider 25 includes a resistor R1 and another resistor R2 placed in series. The lowest rotational speed threshold voltage V2 takes on the decayed voltage of the resistor R2 after the base working voltage V3 outputted by the voltage source terminal VREG is decayed by the resistors R1 and R2 of the voltage divider 25.

Figure 3:
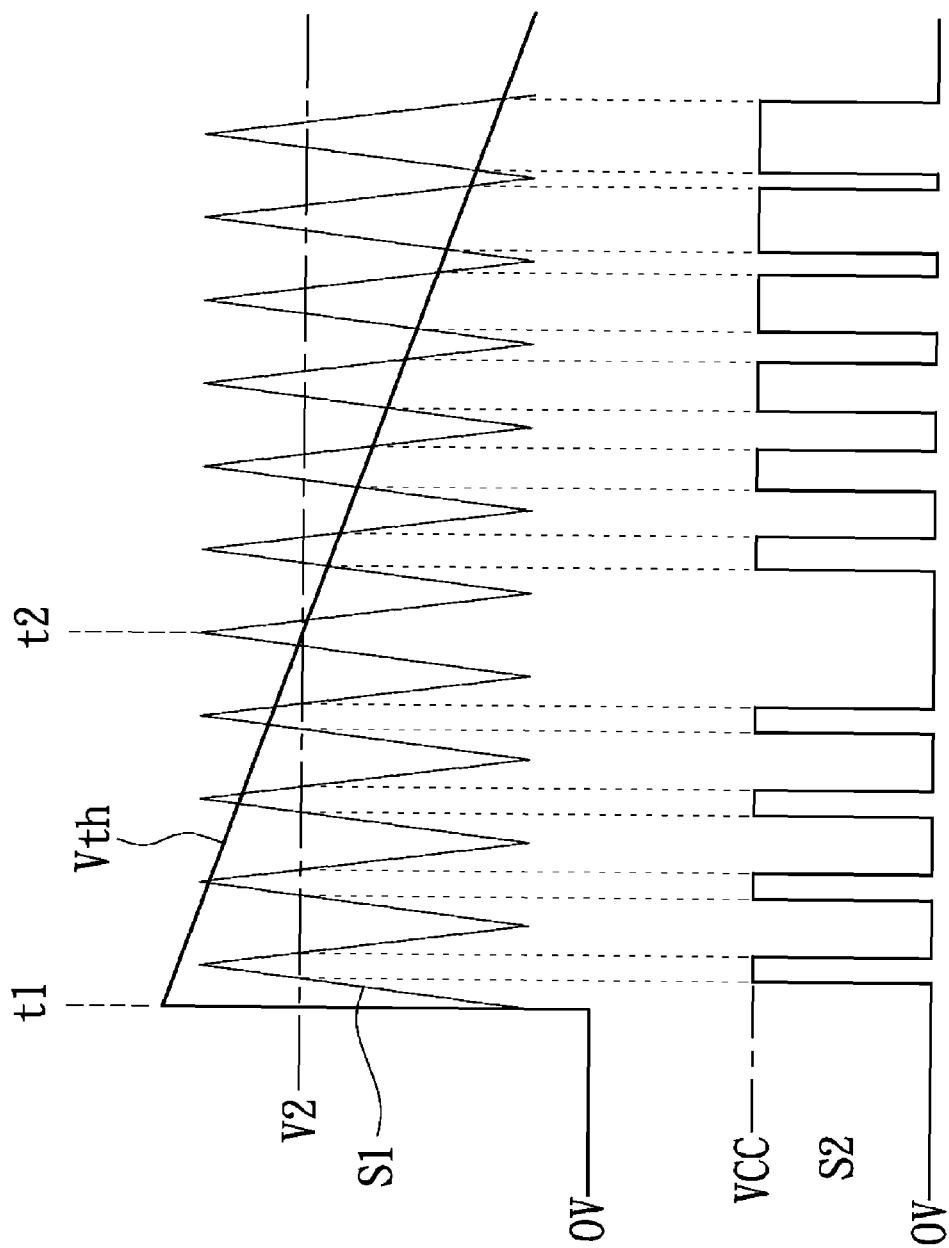
FIG. 3 shows the waveforms for the fan motor control device of the instant disclosure.

Please refer to FIG. 3 in conjunction with FIG. 2. When an input voltage Vth received by the controlled terminal VTH of the controller 20 is greater than the lowest rotational speed threshold voltage V2 received by the lowest rotational speed setup terminal RMI, the magnitude of the working current outputted by the controller 20 is determined by comparing the oscillation signal S1 with the lowest rotational speed threshold voltage V2. Based on the comparison, the controller 20 generates a corresponding driving signal S2 to operate the fan motor 22 in low speed.

Conversely, when the input voltage Vth received by the controlled terminal VTH of the controller 20 is less than the lowest rotational speed threshold voltage V2 received by the lowest rotational speed setup terminal RMI, the magnitude of the working current outputted by the controller 20 is determined by comparing the oscillation signal S1 with the input voltage Vth.

Likewise, based on the comparison between the oscillation signal S1 and the input voltage Vth, the controller 20 generates a corresponding driving signal S2 to operate the fan motor 22. Thereby, the fan speed is adjustable.

The aforementioned driving signal S2 may be a pulse signal, more precisely, a pulse-width modulation (PWM) signal. More specifically, based on the comparison between the oscillation signal S1 and the lowest rotational speed threshold voltage V2, the controller 20 generates a pulse signal with smallest duty cycle to operate the fan motor 22 at low speed. Also, based on the comparison of the input voltage Vth with various magnitudes and the oscillation signal S1, the controller 20 generates a corresponding pulse signal having a specific duty cycle to operate the fan motor 22 at certain speed. In other words, the driving signal S2 having a larger duty cycle operates the fan motor 22 at a greater speed. Meanwhile, the driving signal S2 having a smaller duty cycle operates the fan motor 22 at a lesser speed.

Please refer back to FIGS. 2 and 3. When the controller 20 is powered upon receiving an operating voltage VCC, the base working voltage V3 outputted via the voltage source terminal VREG would enable the starting capacitor Cds to start charging. Based on the charging characteristics of the starting capacitor Cds, the starting capacitor Cds progresses from being shorted to fully charged state in achieving an open circuit status. During the charging period (t1~t2), the input voltage Vth to the controlled terminal VTH of the controller 20 would drop from the higher base working voltage V3 to a pre-determined voltage (can be the lowest rotational speed threshold voltage V2). During this period, the input voltage Vth received by the controlled terminal VTH of the controller 20 would be greater than the lowest rotational speed threshold voltage V2. Thereby, the controller 20 generates the corresponding driving signal S2 to operate the fan motor 22 at low speed. The aforementioned charging period of the starting capacitor Cds can be deemed as the soft start time of the fan motor.

Please refer to FIGS. 2 and 3 again. After the charging period (t1~t2), the starting capacitor Cds is in an open circuit status. Thus, the magnitude of the input voltage Vth to the controlled terminal VTH is determined by the control voltage VI outputted by the converter 26. After the charging period (t1~t2), the input voltage Vth received by the controlled terminal VTH is less than the lowest rotational speed threshold voltage V2. Therefore, based on the comparison between the oscillation signal S1 and the input voltage Vth of various magnitude, the controller 20 would generate a corresponding driving signal S2 having a specific magnitude to operate the fan motor 22 at a certain speed. Hence, the fan speed is self-adjustable.

Based on the above, the fan motor control device of the instant disclosure uses the charging characteristics of the starting capacitor to reduce the input voltage for the controlled terminal of the controller from the higher magnitude to the pre-determined value. During this period, the fan motor control device would provide the working current (increases gradually from zero to a set value) to the fan motor for low speed operation (increases gradually from zero to a set value), hence achieving the soft start status. Consequently, the fan motor control device of the instant disclosure can effectively reduce power consumption, prevent impact due to starting current, and reduce fan noise.

The descriptions illustrated supra set forth simply the preferred embodiment of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A fan motor control device for controlling a soft start of a fan motor, comprising:
   a converter having a signal input terminal, a voltage source output terminal, and a control voltage output terminal, wherein the signal input terminal receives a pulse-width modulation (PWM) signal, and a control voltage is outputted via the control voltage output terminal based on the PWM signal;
   a starting capacitor having a first terminal and a second terminal; and
   a controller having a voltage source terminal, a controlled terminal, and an output terminal, the voltage source terminal being coupled to the first terminal of the starting capacitor and the voltage source output terminal of the converter, the controlled terminal being coupled to the second terminal of the starting capacitor and the control voltage output terminal of the converter, the output terminal being coupled to the fan motor;
   wherein for a soft start condition, the controller controls the soft start of the fan motor based on an input voltage to the controlled terminal with a magnitude of the input voltage determined by a base working voltage outputted via the voltage source terminal; wherein under an normal operating condition, the controller controls the speed of the fan motor based on the input voltage to the controlled terminal with the magnitude of the input voltage determined by the control voltage outputted by the converter.

2. The fan motor control device of claim 1, wherein the controller further comprises a detecting terminal coupled to a motor speed detecting unit, wherein the motor speed detecting unit issues a feedback signal to the detecting terminal based on the fan motor speed.

3. The fan motor control device of claim 2, wherein the controller further comprises a lowest rotational speed setup terminal, wherein a voltage divider is coupled between the lowest rotational speed setup terminal and the voltage source terminal, and wherein the lowest rotational speed setup terminal receives a lowest rotational speed threshold voltage from the voltage divider.

4. The fan motor control device of claim 3, wherein the controller further comprises an oscillation signal setup terminal coupled to a first capacitor, and wherein an oscillation signal having correspond frequency is generated by the controller according to the size of the first capacitor.

5. The fan motor control device of claim 4, wherein when the input voltage to the controlled terminal is greater than the lowest rotational speed threshold voltage, the controller operates the fan motor at low speed according to the lowest rotational speed threshold voltage.

6. The fan motor control device of claim 4, wherein when the input voltage to the controlled terminal is less than the lowest rotational speed threshold voltage, the controller operates the fan motor at a certain speed based on the magnitude of the input voltage to the controlled terminal.

7. The fan motor control device of claim 6, wherein the controller controls the speed of the fan motor based on the comparison between the input voltage to the controlled terminal and the oscillation signal.

8. The fan motor control device of claim 1, wherein the controller is an integrated circuit (IC), a micro controller (MCU), or a chip.

9. The fan motor control device of claim 2, wherein the motor speed detecting unit is a Hall integrated circuit.

* * * * *